US006567913B1

(12) United States Patent
Ryan, Jr.

(10) Patent No.: US 6,567,913 B1
(45) **Date of Patent: *May 20, 2003**

(54) SELECTIVE SECURITY LEVEL CERTIFICATE METER

(75) Inventor: Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/220,656

(22) Filed: Dec. 24, 1998

(51) Int. Cl.[7] .................................................. H04L 9/30

(52) U.S. Cl. ........................ 713/156; 713/166; 713/180; 380/283; 380/285

(58) Field of Search ......................... 713/166, 175–176, 713/170, 156, 158, 152, 181; 380/283–285, 277; 705/1

(56) References Cited

U.S. PATENT DOCUMENTS 4,633,036 A 12/1986 Hellman et al.
4,900,904 A 2/1990 Wright et al. ............... 235/381
5,073,934 A * 12/1991 Matyas et al. ................ 380/30
5,204,961 A * 4/1993 Barlow ....................... 713/166
5,214,702 A 5/1993 Fischer ........................ 380/30
5,416,841 A 5/1995 Merrick ....................... 380/29
5,418,854 A 5/1995 Kaufman et al. ............. 380/23
5,422,953 A 6/1995 Fischer ........................ 380/23
5,448,641 A 9/1995 Pintsov et al.
5,504,818 A * 4/1996 Okano ........................ 713/166
5,768,388 A * 6/1998 Goldwasser et al. .......... 380/30
5,796,841 A 8/1998 Cordery et al.
5,838,812 A 11/1998 Pare, Jr. et al.
5,862,223 A * 1/1999 Walker et al. ................ 705/50
5,987,123 A * 11/1999 Scott et al. ................... 380/28
6,044,350 A * 3/2000 Weiant, Jr. et al. ............. 705/1
6,076,163 A * 6/2000 Hoffstein et al. ........... 713/168
6,158,007 A * 12/2000 Moreh et al. .............. 713/201
6,272,639 B1 * 8/2001 Holden et al. .............. 713/201
6,308,266 B1 * 10/2001 Freeman ..................... 713/156
6,330,677 B1 * 12/2001 Madoukh .................... 713/200

FOREIGN PATENT DOCUMENTS

EP 2306865 A 5/1997 ............. H04L/9/32

* cited by examiner

*Primary Examiner*—Gilberto Barron
*Assistant Examiner*—Kambiz Zand
(74) *Attorney, Agent, or Firm*—Steven J. Shapiro; Angelo N. Chaclas

(57) ABSTRACT

A system includes a device for generating a message; structure for selecting one of a plurality of different private keys stored within the system, each of the plurality of different private keys,providing a different level of security when used in the generation of an SMPKC for the message; apparatus for associating each of a plurality of different service charges with a corresponding one of the plurality of different private keys; a device for generating an SMPKC for the message using the selected one of the plurality of different private keys; and structure for accounting for a one of the plurality of different service charges that corresponds to the selected one of the plurality of different private keys.

7 Claims, 3 Drawing Sheets

258 260 262 264 266 268 256

| KEY | LENGTH | SECURITY LEVEL (YEARS) | INDEN. AMOUNT | SERVICE RATE | PROCESSING TIME |
|---|---|---|---|---|---|
| A | 512 | 2 | $ 100 | $ 0.10 | 0.5 SEC |
| A | 512 | 2 | $ 1,000 | $ 1.00 | 0.5 SEC |
| B | 1024 | 5 | $ 100 | $ 0.25 | 4.0 SEC |
| B | 1024 | 5 | $ 1,000 | $ 2.50 | 4.0 SEC |
| C | 4096 | 15 | $ 100 | $ 0.75 | 4.5 MIN |
| C | 4096 | 15 | $ 1,000 | $ 7.50 | 4.5 MIN |

256

| 258 | 260 | 262 | 264 | 266 | 268 |
|---|---|---|---|---|---|
| KEY | LENGTH | SECURITY LEVEL (YEARS) | INDEN. AMOUNT | SERVICE RATE | PROCESSING TIME |
| A | 512 | 2 | $ 100 | $ 0.10 | 0.5 SEC |
| A | 512 | 2 | $ 1,000 | $ 1.00 | 0.5 SEC |
| B | 1024 | 5 | $ 100 | $ 0.25 | 4.0 SEC |
| B | 1024 | 5 | $ 1,000 | $ 2.50 | 4.0 SEC |
| C | 4096 | 15 | $ 100 | $ 0.75 | 4.5 MIN |
| C | 4096 | 15 | $ 1,000 | $ 7.50 | 4.5 MIN |

SELECTIVE SECURITY LEVEL CERTIFICATE METER

FIELD OF THE INVENTION

The instant invention relates to certificate meters which certify users of electronic commerce and, more, particularly, to a certificate meter for electronic commerce that provides for the selective issuance of digitally signed messages together with corresponding certificates that have different validity periods associated therewith.

BACKGROUND OF THE INVENTION

U.S. Pat. No. 5,796,841, issued to Cordery, et al. on Aug. 18, 1998, (hereinafter referred to as the '841 patent) discloses a certificate meter. The certificate meter of the '841 patent is used in electronic commerce to account for a service charge associated with each use of the certificate meter and to ensure that upon receipt of a message the recipient can verify that (1) the message is genuine and signed by the sender (authentication) and (2) the message has not been altered (integrity). However, the period: for which the certificate issued by the certificate meter is valid, from a security viewpoint, is dependent upon advances made in cryptoanalysis and computing power. That is, it should be assumed that the private key used to digitally sign the message will likely, at sometime in the future, be capable of being compromised. Accordingly, the period of time for which a signed message is considered to be valid is at least partially dependent upon the length of the private key used to sign the message. The larger the private key that is used, the more time consuming and complex are the computations required to compromise the private key.

In view of the above, one way to make the signed message more secure is to use to a private key that is extremely large. Thus, the private key can be made large enough so that any foreseeable advances in computing power will still make determination of the private key impractical. Unfortunately, as the size of the key increases the amount of processing time required to generate and verify a digitally signed message also significantly increases. The potentially large increase in processing time is not acceptable because it decreases the overall efficiency of the certificate meter system.

In addition to the above, not all messages require the same level of security. Some messages need to be protected for a significantly longer period of time and have a large value associated with them (e.g. a home mortgage contract). Other messages need to, be protected for only a few years and have comparatively little value associated with them (e.g. a college ID). Still other messages occur on a frequent basis and therefore the time required to process them must be kept to a minimum (e.g. credit card transaction). As mentioned above, the additional processing overhead required to provide security for a long period of time is burdensome and unwarranted for messages that have only a short life and must be processed quickly. Thus, what is needed is a certificate meter that provides the user with a capability to selectively apply one of a plurality of digital signatures of varying levels of security to a specific message. The selected digital signature will have a validity period that is commensurate with the type of message being processed.

SUMMARY OF THE INVENTION

It is an object of the invention to provide a system that overcomes the limitations of the prior art discussed above. This object is met by providing system including apparatus for selecting and associating one of a plurality of different security levels with a message; and structure for generating a digital signature for the message at times when the one of the plurality of different security levels has been selected and associated with the message, the digital signature for the message being generated based upon the contents of the message and the selected one of the plurality of different security levels.

In yet another embodiment the invention accounts for a service charge associated with the generation of a signed message and public key certificate. In this embodiment the system includes a device for generating a message; structure for selecting one of a plurality of different private keys stored within the system, each of the plurality of different private keys providing a different level of security when used in the generation of an SMPKC for the message; apparatus for associating each of a plurality of different service charges with a corresponding one of the plurality of different private keys, a device for generating an SMPKC for the message using the selected one of the plurality of different private keys; and structure for accounting for a one of the plurality of different service charges that corresponds to the selected one of the plurality of different private keys.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figures 1, 3:
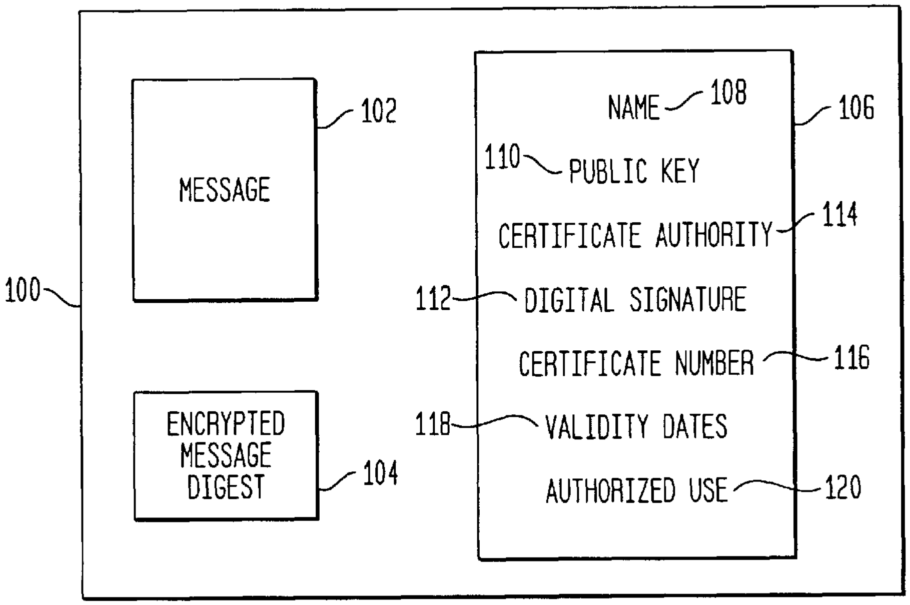
FIG. 1 is a schematic representation of a Signed Message and Public Key Certificate (SMPKC)
FIG. 3 is a security level and indemnification rate table.

Referring to FIG. 1, a signed message with a public key certificate attached thereto (hereinafter referred to as a "SMPKC") is shown at 100. The SMPKC 100 includes a message 102, an encrypted digest of the message 104 (also known as a digital signature), and a public key certificate 106. Message 102 is the actual message being sent by a sender. The encrypted digest 104 is created, for example, by applying a one-way hash function to the message 102 to create a digest of the message and then encrypting the message digest utilizing the sender's private key and an encryption algorithm such as RSA (the encrypted message digest also referred to as a "digital signature"). The public key certificate 106 includes an identification of the certificate holder (sender) 108, the certificate holder's public key 110 which has been digitally signed with the private key of a certificate authority (certificate authority signature 112) who is usually a trusted third party. Furthermore, the public key certificate 106 may also include the name of the certificate authority 114, a unique certificate number 116, the validity dates of the certificate 118 and any specified authorized use of the certificate 120. Alternatively, the public key certificate 106 may be delivered separately from the message 102 and encrypted digest 104 to a recipient. This is particularly useful in systems where communications bandwidth is small. In this case the public key certificate 106 need only be delivered once to each recipient.

In operation, when a sender generates a SMPKC 100, the recipient verifies the authenticity of the public key certificate 106 using the certificate authority's public key, and subsequently verifies that message 102 has not been modified using the sender's public key 110 obtained from the public key certificate 106. That is, the recipient generates a digest of the message 102, decrypts the received encrypted digest 104 using the sender's public key 110, and compares the generated message digest to the decrypted received message digest. If the digests fail to match, the recipient knows that the message has been altered and cannot be relied on.

The above description of the SMPKC is known in the art such that a further detailed description is not considered warranted for an understanding of the instant invention. Moreover, while the SMPKC is an electronic data file in the preferred embodiment, it could also be contained in a printed document or on any other tangible medium such as a smart card or a computer diskette.

Figure 2:
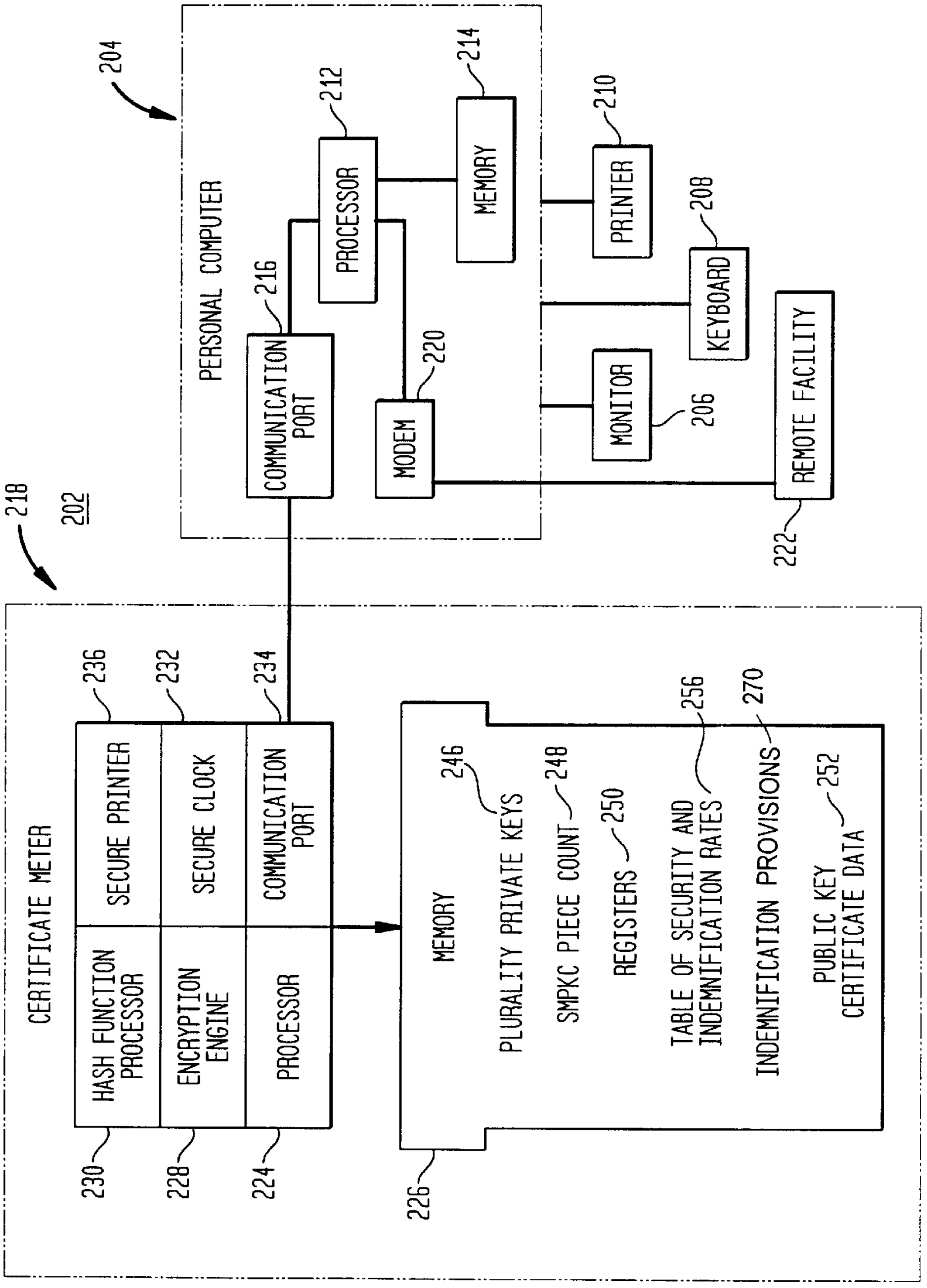
FIG. 2 is a schematic diagram of the inventive certificate metering system.

Referring to FIG. 2, a certificate metering system, shown generally at 202, includes a personal computer 204 connected to a monitor 206, a keyboard 208, and a printer 210. The personal computer 204 additionally includes a processing subsystem 212 having an associated memory 214. The processing subsystem 212 is connected to a communications port 216 for communication with a secure certificate meter subsystem 218 and a modem 220 for communicating with a remote facility 222. It should be recognized that many variations in the organization and structure of the personal computer 204 as well as the certificate metering subsystem 218 can be implemented. As an example, the communications from the modem 220 to the remote facility can be by way of hardwire, radio frequency, or other communications including the Internet. The certificate metering subsystem 218 may take many forms such as, for ex ample, a secure vault type system, or a secure smart card system.

The certificate meter subsystem 218 includes a processor 224 coupled to a memory 226. The processor 224 has associated with it an encryption engine 228, a hash function processor 230, a secure clock 232 and a communications port 234. If desired, either a secure printer or a non-secure printer may be connected to the certificate meter subsystem 218 if a printing capability is desired. In FIG. 2, a secure printer is shown at 236. The memory 226 may have stored within it different data as well as the operating program for the certificate meter subsystem 218. The data shown as stored in memory 226 includes a plurality of private keys 246 which have varying lengths (i.e. 512, 1024, to 4096 bits), an issued SMPKC piece count 248, and SMPKC ascending/descending registers 250 which account for the fees associated with the issuance of individual SMPKC'S as discussed in more detail below. The ascending/descending registers 250 can be conventional accounting circuitry such as that used in postage metering systems which has the added benefit of being capable of being recharged with additional prepaid funds via communication with a remote data center. Additionally, some data stored in memory 226 can be encrypted and stored externally to certificate meter subsystem 218.

Additionally, memory 226 further includes 1) for each of the plurality of private keys 246 corresponding public key certificate data 252 and 2) a table of security and indemnification rates 256 which is shown in detail in FIG. 3. Table 256 includes a key column 258 which includes; pointers "A", "B", and "C" that each correspond to specific one of the plurality of keys 246. A second column 260 shows the length of, each key and a third column 262 indicates the level of protection in years provided, by each key. A fourth column 264 provides different levels of indemnification that the certificate authority is willing to provide for a message digitally signed using a specific private key while a fifth column 266 associates a service charge for the particular private key/level of security/indemnification levels chosen. Finally, a sixth column 268 shows the processing time associated with the use of each private key during the generation of the SMPKC. While table 256 is shown as having the above six columns for the purpose of completely showing the relationship between each of, the column elements, only three columns are really needed. That is, only the rate, indemnification, and security levels are needed since the security level is indicative of the private key to be used. Furthermore, table 256 can incorporate the concepts of U.S. Pat. No. 5,448,641 which provides a mechanism for verifying the integrity of rate tables downloaded from a remote data center. Thus, updates to the table 256 can be provided from the remote facility 222 in such a manner that improper attempts to modify the rate table are detectable.

Figure 4:
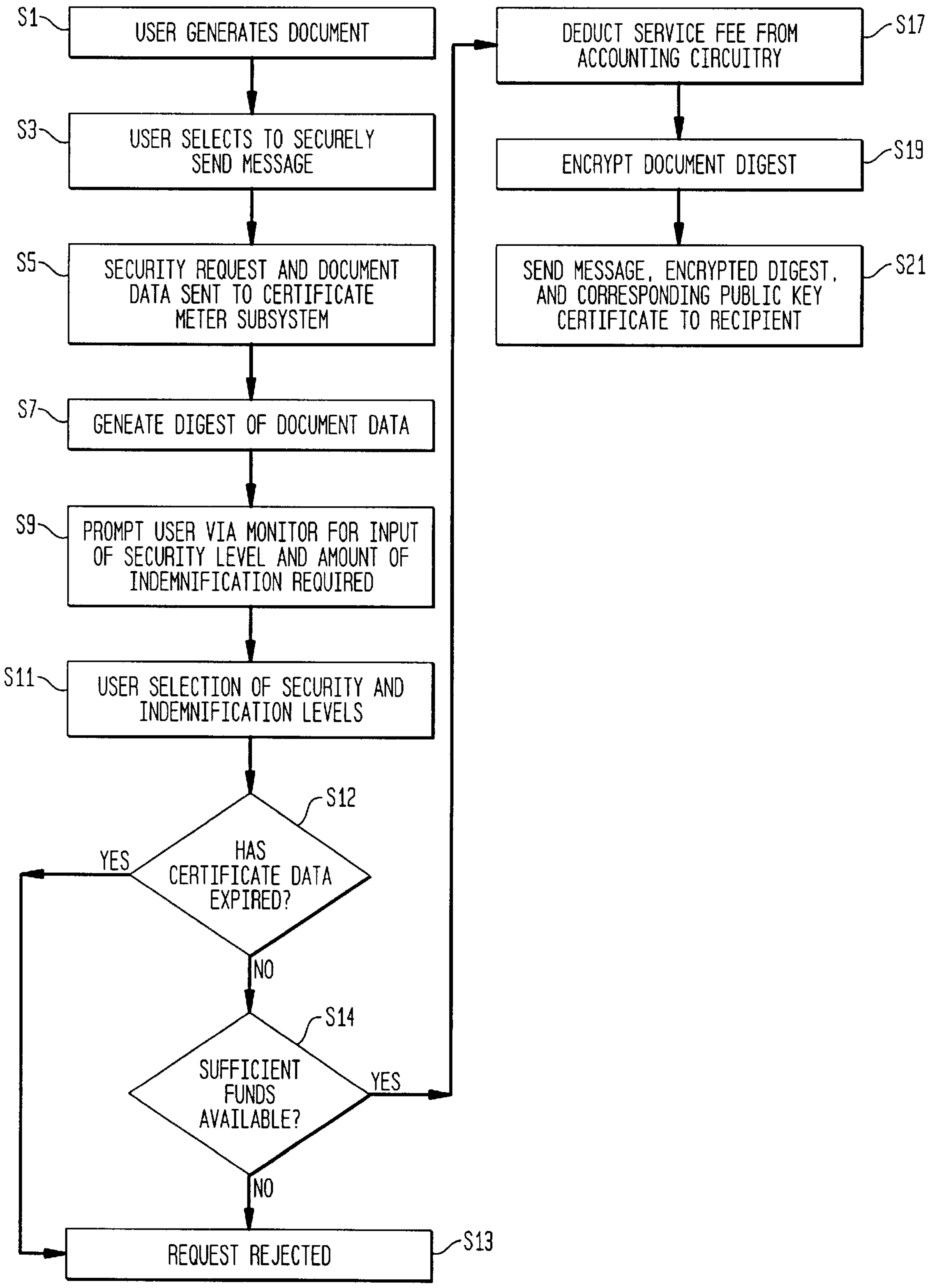
FIG. 4 is a flow chart of the operation of the certificate metering system.

Referring to FIG. 4, the operation of the certificate metering system 202 will be explained. At step S1, a user generates a message (document) utilizing an application program stored in memory 214. Upon completion of the document the user can elect to securely send the message to a recipient via the modem 220 by clicking on an icon appearing oh monitor 206 or alternatively pressing a special function key of keyboard 208 (step S3). In either case, once the security option has been elected the personal computer 204 sends such request together with the document data to the certificate meter subsystem 218 via the communication ports 216 and 234 (step S5). At step S7, the hash function processor 230 generates a message digest of the document data and the user prompted via the monitor 206 as to the level of security and amount of indemnification desired (step S9). In the preferred embodiment at step S9 a rate table having at least columns 262, 264, and 266 will be displayed. Once the user has made their selection (step S11), the certificate meter subsystem 218 checks the corresponding certificate data 252 to determine if it has expired (beyond validity date) (step S12). If the answer at step S12 is "YES", the request is rejected and the user notified of such rejection via the monitor 206 at step S13. If the answer at step S12 is "NO", the certificate meter subsystem 218 determines if sufficient funds are available in the accounting circuit 250 to pay for the requested transaction (step S14). If the answer at step S14 is "NO" the request is rejected and, the user is notified of such rejection via the monitor 205 (step S13). On the other hand, if the answer at step S14 is "YES" the amount of the service charge associated with signing the document is deducted within the accounting circuitry 250 (step S17). At step S19 the message digest is then encrypted utilizing the specific one of the plurality of keys 246 associated with the selected security level/indemnification level and the encryption engine 228 (which contains the encryption algorithm). The encrypted message digest is sent via the computer 204 and modem 220 to a recipient together with its corresponding public key certificate 106 and the document data (step S21).

Regarding the rate table 256, it can be updated from a remote data center during a funds refill process for the ascending/descending registers 250. This provides the certificate authority with the ability change the fee structure over time without requiring the return of the certificate metering system 202. Furthermore, the selected amount of indemnification, the time period for which the indemnification is valid, and other specific terms and conditions of the indemnification being provided can be included as part of the public key certificate and as part of the document data which is digitally signed. Thus, the recipient will obtain such indemnification information in a form that can be used to authenticate the sender and verify that the indemnification information has not been altered. The indemnification provisions 258 can be securely stored within the certificate meter subsystem 218 in the same manner as the rate table 256 so that it can be securely updated from the remote data center 222. Additionally, a plurality of different indemnification provisions 270 can be stored within the certificate meter subsystem 218 with each indemnification provision 270 being tied to a corresponding one of a plurality of specific rate tables 256 stored in memory 226. In this embodiment, the service charge for the indemnification is not only governed by the amount of the indemnification and the indemnification time period but by other indemnification provisions 270. Such other indemnification provisions could include limitations on the certificate authority's liability based on the failure of the recipient or sender to adequately protect their certificate meters or limitations on the types of damages covered by the indemnification (i.e. no indirect or consequential damages).

In yet another embodiment, table 256 can exclude the indemnification column such that only the security level and service rate columns 262/266 are needed. In this configuration no indemnification is provided by the certificate authority and the service charge is based solely on the security provided by the selected one of the plurality of keys 246 (security level).

Finally, the certificate meter subsystem 218 can be programmed to store SMPKC usage information in memory 226. The usage information is used to automatically determine discounts based on predetermined usage thresholds. Thus, when a discount is warranted, the accounting circuitry can account for such discounted service charge.

Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims.

What is claimed is:

1. A system comprising:

means for creating a plurality of messages;

means for selecting and associating one of a plurality of different security levels with each of the plurality of messages created:

means for generating a digital signature for a created message at times when the one of the plurality of different security levels has been selected and associated with the created message, the digital signature for the created message being generated based upon the contents of the created message and the selected one of the plurality of different security levels, the generating means including a memory in which a plurality of private keys are stored and each of the plurality of private keys is associated with a corresponding one of the plurality of different security levels, and the generating means generates the digital signature for the created message using the private key that corresponds to the selected one of the plurality of different security levels; and means for storing public key certificate data that is associated with each of the plurality of private keys and means for sending to a recipient the created message, the digital signature, and a portion of the certificate data that corresponds with the private key that corresponds to the selected one of the plurality of different security levels.

2. A system as recited in claim 1, further comprising means, coupled to the generating means, for accounting for a service charge associated with the generation of the digital signature for the message.

3. A system as recited in claim 2, further comprising a security rate table having a plurality of different service charge that are each associated with a corresponding one of the plurality of private keys and the corresponding one of the plurality of security levels associated with the corresponding one of the plurality of private keys, and means for accessing the security rate table to determine the corresponding service charge for the selected one of the plurality of different security levels.

4. A system as recited in claim 3, wherein the accounting means has funds stored therein which funds are debited by the corresponding service charge when the digital signature is generated.

5. A system as recited in claim 4, further comprising means for preventing the generating of the digital signature at times when the funds stored in the accounting means are below the corresponding service charge.

6. A system as recited in claim 1, further comprising means for determining if the portion of the certificate date has expired and means for preventing the generating of the digital signature at times when it is determined that the portion of the certificate data has expired.

7. A method for sending a message, the method comprising the steps of:

generating a message;

selecting one of a plurality of different private keys stored within the system, each of the plurality of different private keys providing a different level of security when used in the generation of a digital signature for the message;

associating each of a plurality of different service charges with a corresponding one of the plurality of different private keys;

generating the digital signature for the message using the selected one of the plurality of different private keys;

accounting for a one of the plurality of different service charges that corresponds to the selected one of the plurality of different private keys; and sending the digital signature, the message, and a public key certificate that corresponds to the selected one of the plurality of different private keys to a recipient.

* * * * *